Oct. 25, 1966 J. P. FRANCIS 3,281,182
AUTOMOBILE RAIN SHIELD AND SUPPORTING MEANS THEREFOR
Filed July 13, 1965
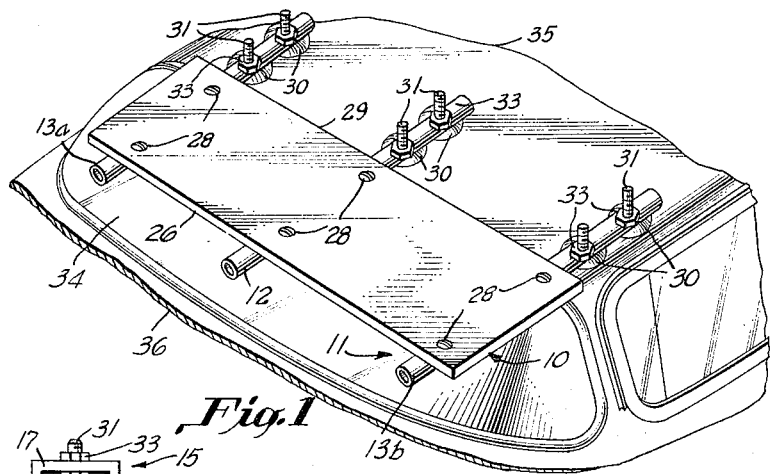
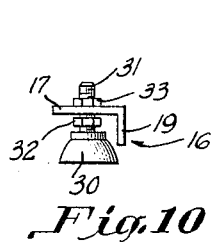
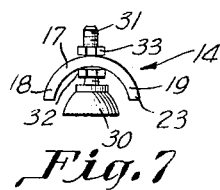
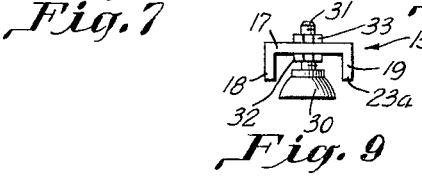
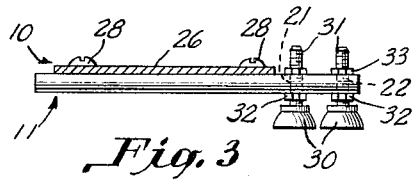
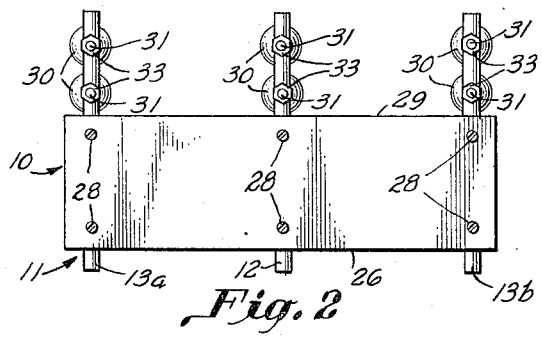
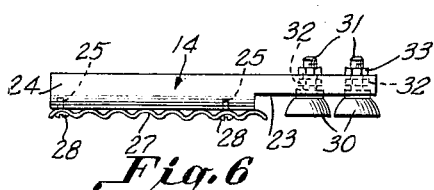
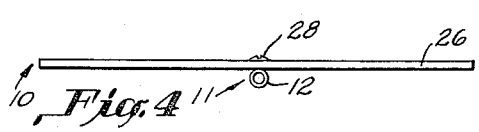
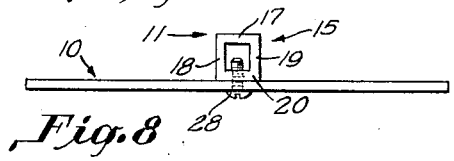
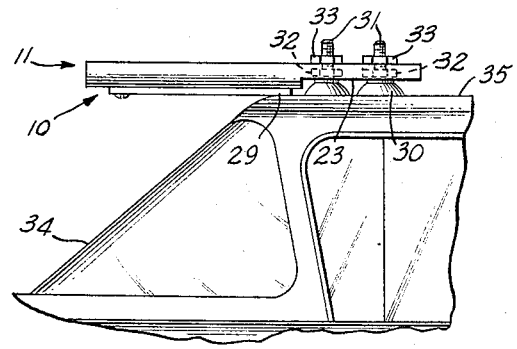
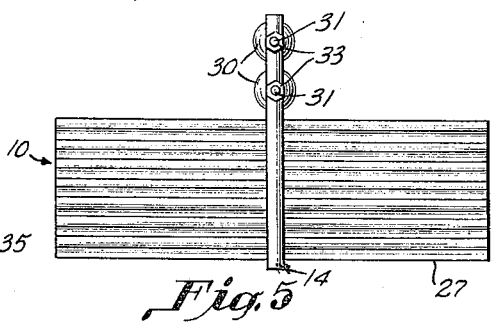
INVENTOR
John P. Francis

United States Patent Office 3,281,182
Patented Oct. 25, 1966

3,281,182
AUTOMOBILE RAIN SHIELD AND SUPPORTING MEANS THEREFOR
John P. Francis, 20 Boston St., Haverhill, Mass.
Filed July 13, 1965, Ser. No. 471,764
3 Claims. (Cl. 296—95)

This is a continuation-in-part of application Serial No. 328,159, filed December 3, 1963, now Patent No. 3,205,000. Visor supports and awning structures are shown and described in my copending application. My invention therefore, is concerned primarily with modified embodiments of visor or rain shield supports.

This invention relates to windshield rain visors or rain shields and the rain shield supporting means for motor vehicles, and more particularly to a temporary or removable rain shield device for use in protecting the windshield area of the vehicle from rain, sleet, snow or ice when the vehicle is parked in a drive-in theatre, or any other outdoor parking area.

A main object of the invention is to provide a novel and improved rain shield and supporting members for a very quick and exceedingly simple attachment and removal, to and from the roof top of a motor vehicle, the entire device being very simple in construction and assembly, and very effective in protecting the windshield area from any precipitation or elements of the weather.

A further object of the invention is to provide a rain shield which may be supported in free frictional and rain sealing engagement with the roof top, or, movably supported in a vertically spaced apart relationship relative to the roof top.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a perspective view of the rain shield and the supporting means for supporting the rain shield over the roof top and the windshield.

FIGURE 2 is a top plan view of the rain shield shown attached and supported onto the rain shield supports.

FIGURE 3 is a side elevation cutaway view of the rain shield shown supported on a rain shield support which is supported from a pair of vacuum cups.

FIGURE 4 is a front elevation view of a rain shield shown supported from a single rain shield support.

FIGURE 5 is a top plan view of a corrugated-shaped rain shield shown supported to the underside of a rain shield support.

FIGURE 6 is a side elevation cutaway view of the corrugated-shaped rain shield shown supported by a modified form of a rain shield support.

FIGURE 7 is a rear, end elevation view of the cutaway portion of the modified form of rain shield support of FIGURE 6.

FIGURE 8 is a front elevation view of a rain shield supported by another modification of a rain shield support.

FIGURE 9 is a rear, end elevation view of the rain shield support of FIGURE 8 without the bottom portion thereof.

FIGURE 10 is a rear, end elevation view of another modification of a rain shield support having only a top and a side wall; and FIGURE 11 is a side elevation view of the rain shield support, showing the rear edge of the rain shield frictionally engaging the roof top of an automobile.

Referring now more specifically to the drawings, attention is directed primarily to FIGURES 1, 2, 5 and 6, wherein numeral 10 generally indicates the rain shield, shown also specifically as rain shields 26 and 27. Numeral 11 generally indicates the rain shield supports, shown also specifically as supports 12, 13a, 13b and 14, and in FIGURES 8, 9 and 10 as supports 15 and 16.

In FIGURE 1, a portion of an automobile 36 is shown with the rain shield 26, which in this embodiment is made of semi-rigid or rigid material, and which may be formed of a flexible material, and supported by the longitudinally disposed rain shield supports 11. The supports 11, shown specifically at the center as 12, and at the opposite lateral ends of the rain shield 26, as 13a and 13b, are supported on the roof top 35 by the vacuum cups 30.

To support the rain shield supports 11, first, the supporting means, comprising the roof engaging vacuum cups 30, with the attached vertically disposed threaded stud members 31, and the stud attached vertically adjustable lower 32 and upper 33 threaded nut members, are either removably or permanently attached to the roof top 35 at the desired location, laterally and longitudinally, as may be noted primarily from FIGURES 1 and 11.

The longitudinally disposed rain shield supports 11, FIGURES 1, 2, 3, 4, 5, 6 and 8, are formed of an upper wall 17, opposing side walls 18 and 19, and a bottom wall 20, on the forward portion thereof. FIGURES 1, 2 and 3 have the supports 11, formed the length thereof, with all of the said walls 17, 18, 19 and 20.

The rain shield support 11, FIGURE 3, is provided with a forward vertical aperture 21, and a rear vertical aperture 22, adapted to freely engage the vertical threaded stud members 31 therethrough. The rain shield support 11 is adjustably supported by a pair of longitudinally spaced apart vacuum cups 30 attached to said stud members 31, and adjustably and vertically supported by each lower threaded nut member 32 and each upper threaded nut member 33. Vertically adjustable spaced apart, or, longitudinally angular adjustment of the rain shield support 11 is provided upon the vertical adjustment of the said threaded nut members 32 and 33 on the said threaded stud members 31.

In FIGURE 6, a modified rain shield support 14 is provided with a four wall forward portion 24, and a reduced or cutaway portion, as at 23, showing a portion of the bottom wall and opposing side walls removed therefrom. In this embodiment, the lower threaded nut members 32 thus engage the underside of the upper wall of the support 14, such as shown for example in FIGURES 7, 9, 10 and 11, whereby a rain shield 10 is supported from the underside of said support 14 in frictional supporting, or in rain sealing engagement with the roof top 35, as in FIGURE 11.

In FIGURE 4, there is shown a rigid or semi-rigid rain shield 26 supported upon a single, centrally located rain shield support 11 having an upper wall, opposing side walls, and a bottom wall.

In FIGURE 5, a corrugated-shaped rain shield 27 is shown supported to the underside of a single, centrally located rain shield support 14.

A modified form of rain shield support 15, FIGURE 8, comprises a substantially rectangular shaped structure having a top wall 17, opposing vertical side walls 18 and 19, and a bottom wall 20. A rain shield 10 is shown supported to the underside of the bottom wall 20 by a rain shield securing member 28 such as a threaded screw or bolt member.

Referring to FIGURE 7, there is shown a rear, end elevation view of the embodiment of FIGURE 6, wherein the rain shield support 14 has a portion of the bottom wall, and portions of the opposing side walls 18 and 19 removed, as at 23, also shown in FIGURES 6 and 11.

Referring to FIGURE 9, there is shown a rear, end elevation view of the embodiment of FIGURE 8, wherein the rain shield support 15 has a portion of the bottom wall, and portions of the opposing side walls 18 and 19 removed, as at 23a.

The reduced or cutaway portions 23 or 23a, FIGURES 6, 7, 9 and 11, enable the rain shield support 11 to be supported in vertical spaced relation above the roof top 35, at 23 or 23a. The bottom wall 20 of the said support 11 supportably engages the roof top 35, directly or indirectly, depending upon whether the rain shield 10 is removably attached above or below the rain shield support 11.

In FIGURE 11, the rain shield 10 is shown supported over the roof top 35 and the windshield area 34 of an automobile 36. The rear lateral edge 29 of rainshield 10 is shown supported in frictional supporting engagement with the roof top 35 and adapted to provide rain sealing engagement with the roof top.

Referring to FIGURE 10, there is shown another modification of a rain shield support 16 having only a top wall 17 and a side wall 19, and supported in the same manner as the other rain shield supports.

Referring back to FIGURE 6, the corrugated rain shield 27 is shown attached to the underside of the support 14 by the threaded securing members 28 engaged to the apertures 25 of support 14.

In FIGURE 2, which is a top plan view, the rain shield 26 is shown supported upon a number of rain shield supports 12, 13a and 13b, as in FIGURE 1. One or more rain shield supports 11, such as support 12 alone, or single supports as shown in FIGURES 4, 5 and 8, may be used to support a rain shield 10.

It is quite obvious that the rain shield 10 may be supported against the forward edge of the roof top, or supported downwardly on the roof top, or supported in spaced apart relationship relative to the roof top. The location or manner of support of the said rain shield 10 depends upon the longitudinal location of the vacuum cups 30, or the structural form of rain shield support 11 used, or the attachment of the rain shield 10 either above or below the said support 11, or the vertical adjustment of the threaded nut members 32 and 33 on the vertical threaded stud members 31.

The rigid or semi-rigid rain shield 10 may be constructed of plastic, sheet metal, waterproof cardboard, thin Masonite, or any other suitable preferably thin and light material. It is readily seen that a fully flexible or fabric rain shield may be supported upon the three rain shield supports 11, such as in FIGURES 1 and 2.

A side elevation view of the rain shield support 11, FIGURE 3, and in FIGURE 5 a top plan view of a corrugated rain shield 27 supported to the underside of a rain shield support, is adapted to provide frictional supporting engagement of the rain shield 27 on the roof top without any reduced or cutaway rear portion 23 or 23a on the support 11. This is accomplished when the corrugated rain shield 27 is of sufficient vertical height in the alternate ridges and grooves, and the vacuum cups 30 reduced in vertical height construction.

The rain shield device may be removably attached on the roof top over the rear window, or supported laterally to protect an open window, as for example while parked in a drive-in restaurant area.

The exceptional simplicity in the complete structure and removable attachment of the rain shield device to and from the roof top of an automobile; the numerous advantages in the various methods of erection and attachment on the roof top; the various types of weather protection provided, and; these benefits all enjoyed and benefitted by both the management and the patrons during inclement weather conditions, while viewing outdoor movies or the like, or other outdoor activities.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. A rain shield for the windshield of a motor vehicle secured to the roof top thereof comprising a removably attached rigid rain shield panel, a single longitudinally disposed and centrally located rain shield support, said support having at least one side wall depending downwardly therefrom, said side wall providing longitudinal rigidity for the length of the portion of said support which extends unsupported a substantial distance forwardly of the attached roof engaging means, said side wall being larger in vertical height forwardly of the roof engaging means and extending downwardly, said downward extension of said side wall freely engaging a portion of the roof top for supporting engagement thereto, said rain shield panel being removably attached and supported onto the upper surface of said centrally located support, the outer longitudinal sides of said rain shield panel overhanging said centrally located rain shield support in an unsupported manner a substantial distance laterally and outwardly from said support, roof engaging means mounted on the roof top and engaging the underside of the rear portion of said rain shield support in supporting said support therefrom and over the roof top and the windshield area, said rain shield support supporting said removably attached rain shield panel over the windshield area in spaced relationship relative to the roof top in providing maximum weather protection to a windshield having a substantially angled and large surface area.

2. A rain shield for the windshield of a motor vehicle secured to the roof top thereof comprising a removably attached rain shield panel, longitudinally disposed laterally spaced apart rain shield supports, each of said supports having a longitudinally extending upper wall, at least one side wall depending downwardly from said upper wall, said side wall providing longitudinal rigidity for the length of the portion of said support which extends unsupported a substantial distance forwardly of the attached roof engaging means, said side wall being larger in vertical height forwardly of the roof engaging means and extending downwardly, said downward extension of said side wall freely engaging a portion of the roof top for supporting engagement thereto, and a longitudinally extending bottom wall extending from the said side wall of said rain shield supports, said bottom wall terminating in a spaced distance from and forwardly of the roof engaging means, said rain shield panel being removably attached and supported onto the upper surface of the upper wall of said supports, roof engaging means mounted on the roof top and engaging the underside of the said upper wall of the rear portions of said rain shield supports in supporting said supports therefrom and in proximity to the roof top and over the windshield area, said rain shield supports supporting said removably attached rain shield panel over the windshield area and in proximity to the roof top in providing maximum weather protection to a windshield having a substantially angled and large surface area.

3. A rain shield for the windshield of a motor vehicle secured to the roof top thereof comprising a removably attached rain shield panel, longitudinally disposed laterally spaced apart rain shield supports, each of said supports having a longitudinally extending upper wall, at least one side wall depending downwardly from said upper wall, said side wall providing longitudinal rigidity for the length of the portion of said support which extends unsupported a substantial distance forwardly of the attached roof engaging means, said side wall being larger in vertical height forwardly of the roof engaging means and extending downwardly, said downward extension of said side wall freely engaging a portion of the roof top for supporting engagement thereto, said rain shield panel being removably attached and supported onto the upper surface of the upper wall of said supports, roof engaging means mounted on the roof top and engaging the underside of the said upper wall of the rear portions of said rain shield supports in supporting said supports therefrom and in proximity to the roof top and over the windshield area, said rain shield supports supporting said removably attached rain shield panel over the windshield area and in proximity to the roof top in providing maximum weather protection to a windshield having a substantially angled and large surface area.

References Cited by the Examiner

UNITED STATES PATENTS

| | | | |
|---|---|---|---|
| 2,783,082 | 2/1957 | Genua | 296—95 |
| 2,812,208 | 11/1957 | Francis | 296—95 |
| 2,878,866 | 3/1959 | Jimcosky et al. | 296—95 X |
| 2,922,472 | 1/1960 | Callahan et al. | 296—44 |
| 2,984,300 | 5/1961 | Francis. | |
| 3,048,439 | 8/1962 | Brigmon | 296—95 |

BENJAMIN HERSH, *Primary Examiner.*

J. A. PEKAR, *Assistant Examiner.*